UNITED STATES PATENT OFFICE.

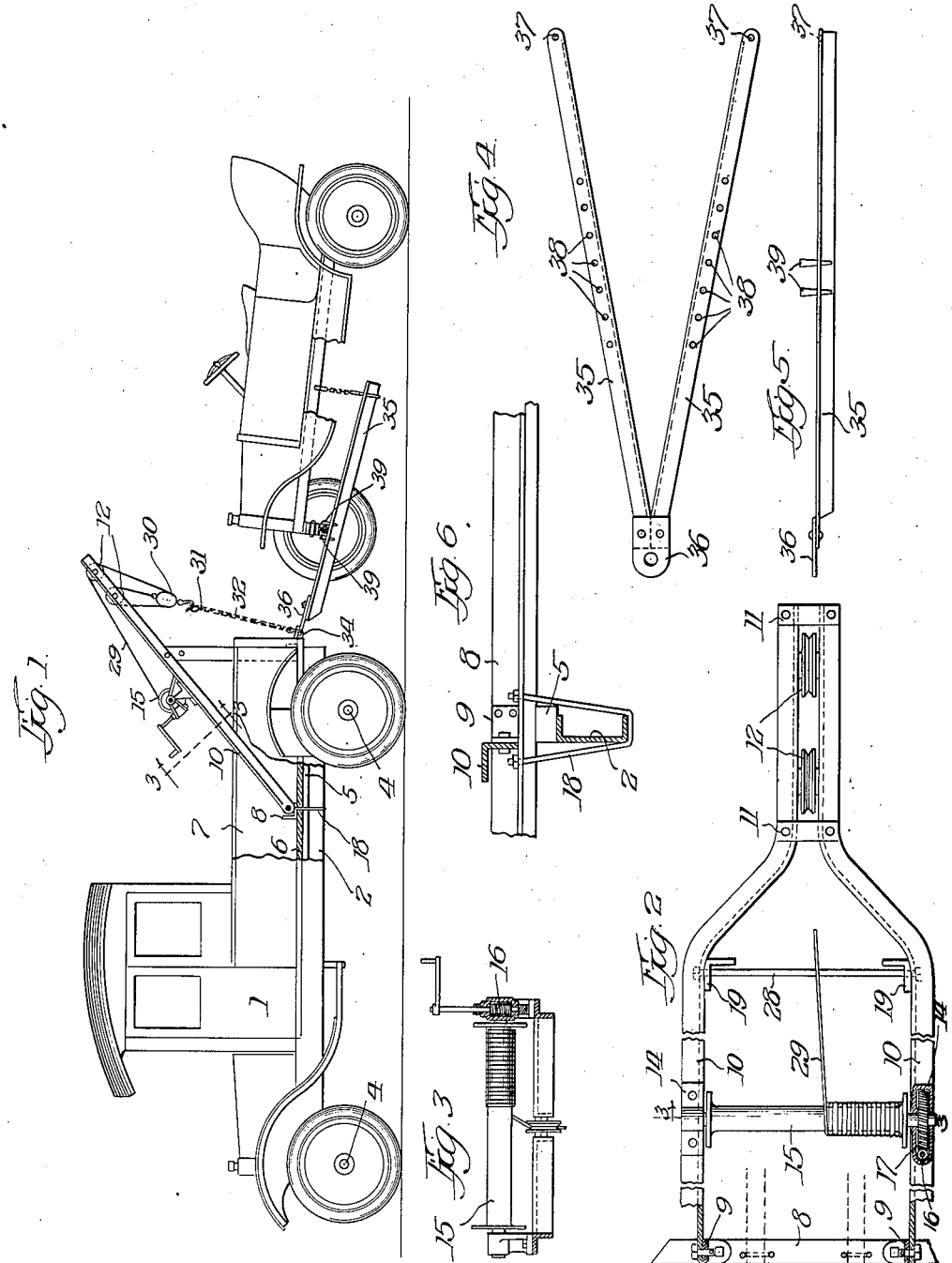

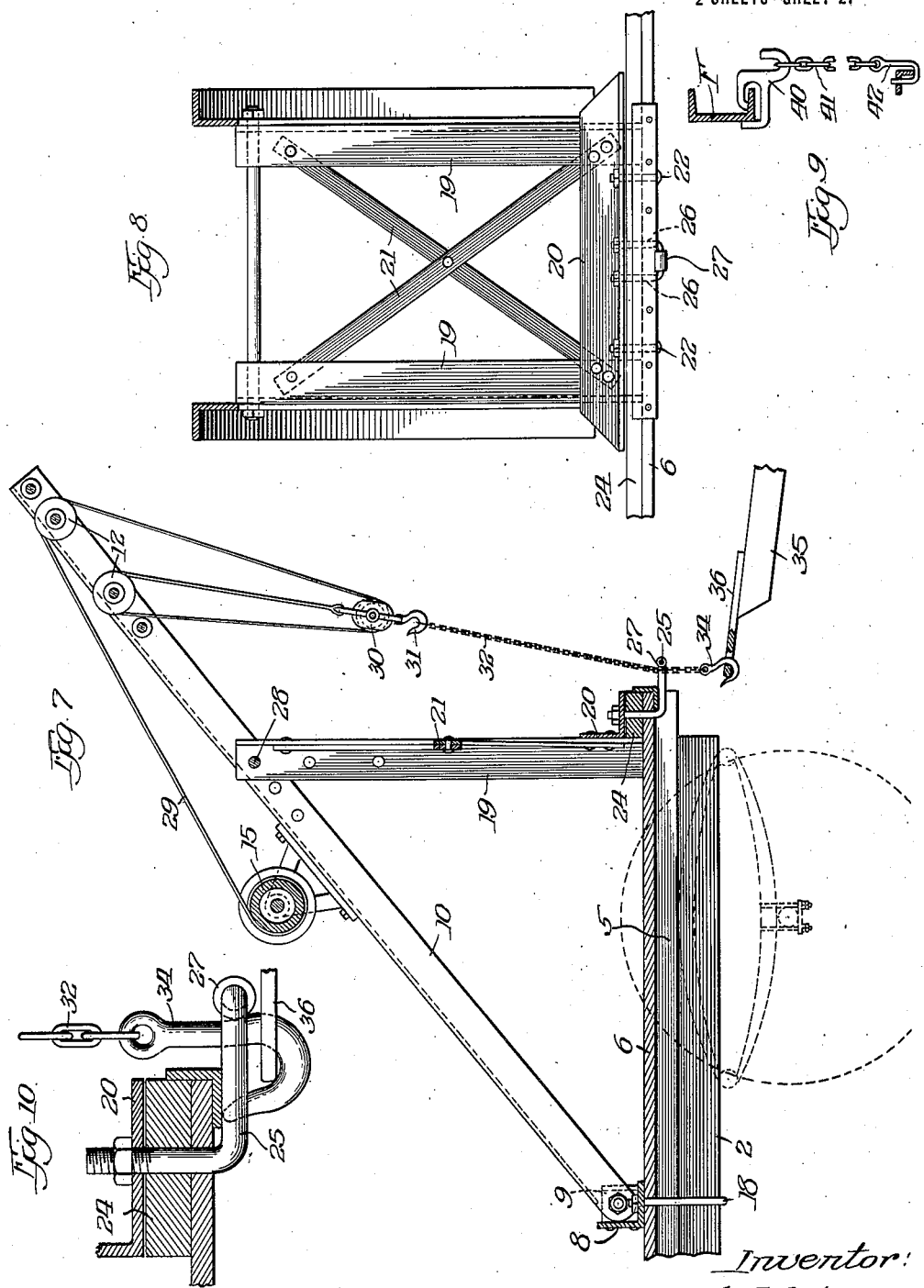

ALBERT J. DUKEN, OF CHICAGO, ILLINOIS.

VEHICLE-TOWING CRANE.

1,420,369.

Specification of Letters Patent. Patented June 20, 1922.

Application filed December 2, 1920. Serial No. 427,667.

*To all whom it may concern:*

Be it known that I, ALBERT J. DUKEN, a citizen of the German Republic, residing at Chicago, in the county of Cook and State of Illinois, have invented certain new and useful Improvements in Vehicle-Towing Cranes, of which the following is a specification.

This invention relates to movable hoisting apparatus and pertains particularly to improvements in mechanism designed for towing disabled vehicles. The invention resides in a new and improved organization of means including a vehicle which is preferably a motive vehicle, hoisting equipment carried thereby in proper relation where it may be operated to elevate from the ground portions of a disabled vehicle, and a cradle designed for attachment to the disabled vehicle as a carrying member whereby it may be elevated and connected to the motive vehicle to permit its being towed with disabled portions out of contact with the ground.

The general purpose of my invention is the provision of an apparatus of the sort specified, which is simple and strong in construction and operation, economical in cost, light in weight, and as nearly universal as possible in its susceptibility of use.

A more particular object of the invention is the provision of an apparatus of the sort specified, which may be operated entirely by one man, both to effect the proper mounting and hoisting of the disabled vehicle, and the operation of the towing vehicle in moving the same.

Another object of the invention is the provision of apparatus of the sort specified wherein the towed vehicle may be partly supported by the towing vehicle and partly supported on its own running gear while it is being towed, and whereby the disabled vehicle is securely maintained in the desired relationship to the towing vehicle with entire safety to both, without danger of upsetting, and permitting full freedom of movement of the towing vehicle in proceeding, curving, backing, and the like.

Another object of the invention is the provision of an apparatus whereby portions of the disabled vehicle may be supported from the towing vehicle without danger of further injury to the towed vehicle due to its partial suspension, and whereby the towed vehicle is afforded spring support both from its own running gear and from the running gear of the towing vehicle.

Another object of the invention is the provision of apparatus of the kind specified, which is adapted for the towing of any of the various kinds of automobiles now in use, which is adapted to tow the injured vehicle either frontward or backward, depending upon which portion of its running gear is disabled, and which is adaptable also to a great variety of other uses.

A still further object of the invention is the provision of an apparatus of the kind specified which is adapted for assembly upon any of a great variety of forms of vehicles whereby it may be carried and whereon it may be operated.

Still other and further general and specific objects of the invention will be specified or rendered obvious hereinafter, indicated in the appended claims or illustrated in the accompanying drawings forming a part of this specification, reference being had to the particular form herein disclosed simply for the purpose of illustrating the invention, and not with the idea that the invention as hereinafter claimed is limited to the particular embodiment disclosed.

In the said drawings,

Fig. 1 represents a side view of an embodiment of my invention illustrating its use in towing an automobile, certain parts being broken away for the purpose of clear disclosure;

Fig. 2 is a fragmentary top view of the portion of the apparatus which I will designate as the crane;

Fig. 3 is a sectional view of the same substantially on line 3—3 of Fig. 2;

Fig. 4 is a top view of the cradle;

Fig. 5 is a side view of the same;

Fig. 6 is a detail illustrating the manner of connecting the crane foot to the vehicle frame;

Fig. 7 is a median longitudinal section through the crane and parts of the vehicle upon which it is mounted;

Fig. 8 is a rear elevation of the compressed leg of the crane;

Fig. 9 is a detail illustrating the manner of attaching the cradle to a frame part of a vehicle to be towed; and Fig. 10 is a detail illustrating the arrangement of means for retaining the cradle during the towing operation.

Referring to the drawings by means of reference characters, let it be understood that the numeral 1 designates generally a suitable carrying vehicle, which preferably is of automotive type, having longitudinal frame members 2 supported on axles 4 by means of proper vehicle springs. Preferably, longitudinal body frame members 5 are carried on the frame members 2, and provide supports for body flooring 6. The body portion of the vehicle may be formed as desired, but preferably is provided with laterally disposed housings 7 capable of use as tool boxes and the like. Movably mounted between these housing is the crane. This includes a foot anchor member 8 which may be formed conveniently of a straight angle bar having one flange adapted to lie flat on the floor of the body and the other flange extending vertically therefrom. This anchor member is provided with brackets 9 on which are pivoted rearwardly extending parallel arms 10. These preferably are also angle bars, which extend rearwardly from the foot 8 for the desired distance, and then are deflected inwardly toward each other and then again into parallel relationship, in which disposal they are retained by cleats 11 to form a substantially unitary member. Rotatably mounted on the vertical flanges of said anchor members adjacent their rearward extremities are sheaves 12, while brackets 14 mounted on said angle bars a substantial distance in front of said sheaves, afford bearings for the windlass 15 of a winch mechanism. This may be of any suitable power compounding sort, and is here illustrated by the crank driven worm 16 and worm wheel 17 mounted in a housing on one of the brackets 14 in such relation that the windlass lies above the frame members of the crane. The anchor foot 8 is designed to be attached to the carrying vehicle by means of U bolts 18 arranged to embrace the longitudinal frame members 2 and pass through apertures drilled at proper points in the horizontal flange of the foot member, where they are retained by nuts. This permits mounting of the crane on various bodies, as the apertures may be bored at suitable points with reference to the longitudinal frame members, and it also provides direct attachment of the crane to the most substantial members of the vehicle frame. The point of attachment is preferably in front of the rear axle of the vehicle. Due to the pivotal mounting of the crane frame upon the brackets 9, it may be swung to various elevations in a vertical arc, and it may be supported at the desired elevation by a compression member illustrated in Fig. 8. This compression member is formed of upright struts 19 here illustrated as angle members, with their outer flanges extending longitudinally of the vehicle. They are attached at their lower ends to a horizontal anchor member 20 which lies transversely of the vehicle and has its upright flange riveted to the transverse flanges of the strut members. The strut members are stayed by suitable cross members 21. This compression member preferably is located at the rear extremity of the body of the carrying vehicle, where it is substantially supported by the body frame members 5. It is secured to the body bolt 22 through the rear transverse frame member 24 of the vehicle body, and at its middle portion forms a mounting for the guide loop 25. The latter has two arms 26 which pass up through the frame member 24 and the horizontal flange of the member 20 and are secured in place by nuts, and a horizontal loop which extends out a substantial distance from the frame member 24 and carries anti-friction sleeve 27. The movable crane frame is supported on the strut members 19 by means of a rod 28 which may be inserted through apertures in the outer flanges of said strut members, and through apertures in the depending flanges of the bars 10, said apertures being disposed at different points to permit the retention of the swinging crane frame at different elevations. A cable 29 is arranged to be wound on the windlass, and carries a pulley block 30 on its portion suspended from the sheaves 12. Said pulley block carries a hook 31 arranged to carry a chain 32 which passes downward through the loop 25 and carries a hook 34.

The cradle is formed of a pair of angle bars 35 disposed in converging relationship with their upper flanges horizontal, said bars being secured together at their forward extremities by a ring plate 36. Adjacent the rearward extremities of said bars the horizontal flanges are provided with apertures 37 for attachment of the sling hooks, and in their mid portions with series of apertures 38, the several apertures in which series are disposed oppositely. Taper pins 39 are arranged to be seated in the apertures 38, there being two of such pins for each bar 35. Associated with the cradle are flexible slings (see Fig. 9) each comprising a universal hook 40, suspension chain 41 and cradle hook 42. The latter is adapted to engage in an aperture 37 of the cradle to constitute a support for the rear end of the cradle, while the universal hooks 40 are of a construction adapted to engage a frame member F of the type customarily utilized for frames of automobiles or similar vehicles, in such fashion that they are held in secure engagement with such frame member by downward traction upon the chain 41. The method of mounting the vehicle on the cradle is illustrated in Fig. 1. The cradle is placed below the vehicle, crossing under the axle at the disabled end, and the slings are connected to the rearward ends of the cradle and to the frame of the vhicle in the manner above described. The forward end of the cradle projects beyond the end of the disabled vehicle, and, the towing vehicle being positioned with the crane in proper relationship to the disabled vehicle, the hook 34 is engaged in the ring plate 36 at the front end of the cradle, and the cradle elevated until it contacts with the axle of the disabled vehicle. The taper pins 39 are then placed in the adjacent apertures 38 on opposite sides of the vehicle axle, where they are effective to prevent longitudinal movement of the cradle relative to the vehicle. The front end of the crane is then hoisted by operation of the winch mechanism, the hoisting chain 32 being guided in the loop member 25, running freely by virtue of the rotatable sleeve 27. This hoisting of the front end of the cradle operates it as a lever fulcrumed to the frame of the disabled vehicle and effective against the front axle thereof, with a result that the disabled end of the vehicle is elevated from the ground. When the vehicle is elevated the desired distance, the shank of the hook 34 will pass through the loop member 25, and the point of the hook will contact with a portion of the frame or body members on which it is mounted, with a result that the ring plate 36 will be securely confined and locked against detachment from the hook. This connection between the ring plate 36 and the hook 34 affords a pivotal coupling between the towed vehicle and the towing vehicle, so that the former will follow in the trace of the latter and has the necessary free angular movement to permit curving.

With the disabled vehicle thus mounted, it will be observed that its weight is supported partially on its own wheels which are left on the ground, and partially on the towing vehicle, and that it may be rolled along on the former under the motive power of the towing vehicle. It will be observed, furthermore, that the disabled vehicle is given full spring support, due to the fact that the elevated axle is supported below its springs by the cradle member, which latter is spring supported from the axle of the motive vehicle and from the springs of the effective axle of the towed vehicle. As a result, the body and frame carried parts of the disabled vehicle are maintained substantially in their normal relationship with their supporting axles, and are not subjected to pounding and vibration from the roadway, and are not wrenched or sprung apart from the running gear or drive connections as would be the case where the vehicle was supported above its springs. The towed vehicle is always maintained in proper relationship to the towing vehicle so that the two may turn corners freely, may be backed safely and accurately and may proceed at proper speeds. The widely separated lateral support points afforded by the operative wheels of the towed vehicle, the wheels of the towing vehicle, and the frame and axle connections of the former with the cradle, maintains the towed vehicle at all times against turning over, without throwing dangerous stresses upon the towing connection. A disabled vehicle may be thus mounted by a single workman, who first positions the towing vehicle, places and connects the cradle, and then operates the winch to elevate the parts to towing position. It is obvious that the disabled vehicle may be towed either frontwardly or rearwardly, depending upon whether the front or rear running gear is disabled, and that the form and nature of the connections between the cradle and the disabled vehicle, and the adjustability of the crane on the towing vehicle permit the accommodation of the apparatus to any form of automobile now in use. The nature of the crane construction renders it very strong for its weight, and permits its being mounted on any form of vehicle frame.

Another important advantage of my apparatus lies in the fact that it does not require the use of any kind of ambulance or auxiliary wheels for supporting the disabled vehicle, though, obviously such may be used in conjunction with my apparatus to support the rearward end of the towed vehicle in event both ends of its running gear are disabled. A feature of particular advantage resides in the fact that with the combination of parts claimed, a construction is provided whereby very heavy vehicles may be towed by a very light one, as the leverage exerted on the latter by the supported portion of the towed vehicle may be made so short as to avoid lifting the front running gear of the towing vehicle to any extent, or to lessen its tractive effect necessary for steering. By utilizing bolts as pivotal connections between the bars 35 of the cradle and the ring plate 36, the bars may be folded together when the cradle is not in use, to permit its being carried conveniently on the towing vehicle.

I claim:

1. A vehicle towing apparatus comprising in combination, a motive vehicle, a crane mounted on the same, hoisting mechanism suspended on the crane, a cradle arranged for attachment to the axle of a disabled vehicle and connected with the hoisting mechanism so that it may be elevated thereby, and means for retaining the hoisting mechanism to permit pivotal movement of the cradle thereon.

2. A vehicle towing apparatus comprising in combination, a motive vehicle, a crane mounted on the same, hoisting mechanism suspended on the crane, means engaging the hoisting mechanism to limit lateral movement thereof, and a cradle arranged for attachment below the springs of a disabled vehicle and connected with the hoisting mechanism so that it may be elevated thereby.

3. A vehicle towing apparatus comprising in combination, a motive vehicle, a crane mounted on the same, hoisting mechanism suspended on the crane to depend at the rear of the vehicle, a cradle arranged for attachment to a vehicle to exert leverage on an axle thereof and operable by said hoisting mechanism, and means retaining the cradle against longitudinal movement relative to the vehicle.

4. A vehicle towing apparatus comprising in combination, a motive vehicle, a crane mounted on the same, hoisting mechanism suspended on the crane, and a cradle pivotally connected with the hoisting mechanism and arranged for attachment to a vehicle to exert leverage on an axle thereof.

5. A vehicle towing apparatus comprising in combination, a conveyance, a crane mounted on the same, a cradle arranged for attachment to a vehicle axle in position to extend beyond the end of the vehicle, hoisting mechanism suspended on the crane and arranged for operative engagement with the extending end of the cradle and means cooperating with the hoisting mechanism to prevent longitudinal movement of the cradle.

6. A vehicle towing apparatus comprising in combination, a conveyance, a crane mounted on the same, a cradle arranged for adjustable attachment to a vehicle in positions to extend to variable distances beyond the end of the vehicle, hoisting mechanism suspended on the crane and arranged for operative engagement with the extending portion of the cradle, and means for restraining the forward end of the cradle against lateral and longitudinal movement relative to the conveyance.

7. A vehicle towing apparatus comprising in combination, a conveyance, a crane mounted on the same and extending beyond its rear extremity, a cradle arranged for attachment to a vehicle frame in position to extend beyond the end of the vehicle, means for securing such vehicle against longitudinal movement on the cradle, and hoisting mechanism suspended on the crane and arranged for operative engagement with the extending end of the cradle.

8. A vehicle towing apparatus comprising in combination, a motive vehicle, a crane mounted on the same, hoisting mechanism operably associated with the crane, and a cradle arranged for attachment at its mid portions and one end to a vehicle and at its other end to said hoisting mechanism.

9. A vehicle towing apparatus comprising in combination, a motive vehicle, a crane mounted on the same, hoisting mechanism operably associated with the crane, and a cradle arranged for engagement at its mid portions with a vehicle axle and at one end for attachment to a frame portion of such vehicle and at its other end for attachment to said hoisting mechanism.

10. A vehicle towing apparatus comprising in combination, a motive vehicle, a crane mounted on the same, hoisting mechanism operably associated with the crane, and a cradle operable by the hoisting mechanism and arranged to engage the axle of a vehicle at two points separated longitudinally of the axle, and means for engagement with the axle to retain it against movement longitudinally of the cradle.

11. A vehicle towing apparatus comprising in combination, a motive vehicle, a crane mounted on the same, hoisting mechanism operably associated with the crane, a cradle operable by the hoisting mechanism and arranged in cooperation therewith to support the axle of a vehicle at two points separated longitudinally of the axle, and means for connecting the cradle to the frame of the supported vehicle.

12. A vehicle towing apparatus comprising in combination, a motive vehicle, a crane mounted on the same, hoisting mechanism operably associated with the crane, and a cradle having pivotal connection with the hoisting mechanism and arranged in cooperation therewith to support the axle of a vehicle at two points separated longitudinally of the axle.

13. A vehicle towing apparatus comprising in combination, a motive vehicle, a crane mounted on the same, hoisting mechanism operably associated with the crane, and a cradle having pivotal connection with the hoisting mechanism and arranged for connection to the frame of a vehicle and to engage the axle of said vehicle at two points separated longitudinally of the axle.

14. A vehicle towing apparatus comprising in combination, a motive vehicle, a crane mounted on the same, hoisting mechanism operably associated with the crane, and a cradle adapted for flexible connection to a frame portion of a vehicle and movable by said hoisting mechanism to engage running gear portions of such vehicle while so connected.

15. A vehicle towing apparatus comprising in combination, a motive vehicle, a crane mounted on the same, hoisting mechanism operably associated with the crane, a cradle having pivotal connection with said hoisting mechanism, and operable thereby to engage running gear portions of a disabled vehicle, and means for flexibly connecting said cradle to a frame portion of the disabled vehicle.

16. An apparatus for towing vehicles comprising the combination of a motive vehicle, a crane mounted on the same, hoisting mechanism operably associated with the crane and including a vertically movable suspension member, and a guide for said member mounted on substantially the longitudinal axis of the vehicle for limiting movement of said member laterally and longitudinally of the vehicle.

17. In a vehicle towing apparatus a combination comprising a motive vehicle, a crane mounted on the same, hoisting mechanism suspended on the crane and including a vertically movable suspension member, and a guide on the vehicle effective upon said suspension member to limit its upward movement by the hoisting mechanism.

18. A vehicle towing apparatus comprising the combination of a motive vehicle, a crane mounted on the same, hoisting mechanism suspended on the crane, an attaching member operable by the hoisting mechanism and arranged to engage a disabled vehicle, and a guide on the motive vehicle effective upon said attaching member to limit its upward movement while it is retained by the hoisting mechanism.

19. A vehicle towing apparatus comprising the combination of a motive vehicle, a crane mounted on the same, hoisting mechanism suspended on the crane, an attaching member pivotally connected to the hoisting mechanism and arranged to engage a disabled vehicle, and a guide on the motive vehicle effective upon said attaching member to limit its upward movement while it is retained by the hoisting mechanism.

20. A vehicle towing apparatus comprising the combination of a motive vehicle, a crane mounted on the same, hoisting mechanism suspended on the crane, an attaching member pivotally connected to the hoisting mechanism and arranged to engage a disabled vehicle, and a guide on the motive vehicle effective upon said attaching member to limit its upward and lateral movement while it is retained by the hoisting mechanism.

21. A vehicle towing apparatus comprising the combination of a motive vehicle, an anchor member disposed transversely thereof, means for connecting said anchor member to the frame of said vehicle, an arm connected to said anchor member and extending rearwardly therefrom beyond the rear extremity of the vehicle, a strut member anchored on the vehicle adjacent its rear extremity and engaged with the arm to support the same at an elevation, hoisting mechanism operably suspended on said arm, suspension means operable by said hoisting mechanism beyond the rear extremity of the vehicle, and a guide for said suspension means fixedly mounted on the vehicle.

22. A vehicle towing apparatus comprising the combination of a motive vehicle, an anchor member disposed transversely thereof, means for connecting said anchor member to the frame of said vehicle, laterally disposed arms connected to said anchor member and extending rearwardly therefrom beyond the rear extremity of the vehicle, a strut member anchored on the vehicle adjacent its rear extremity and engaged with the arms to support the same at an elevation, hoisting mechanism operably suspended on said arms, suspension means operable by said hoisting mechanism beyond the rear extremity of the vehicle, and a guide for said suspension means fixedly mounted on the vehicle.

23. In a vehicle towing apparatus, the combination with a movable hoisting apparatus of a cradle member having laterally disposed rigid arms, connection members associated with the rearward extremities of said arms for attachment to a vehicle frame when the cradle is below an axle of the vehicle, and a connection member fixed to the forward extremity of said arms and adapted for operative engagement by the hoisting mechanism.

24. In a vehicle towing apparatus, the combination with a movable hoisting apparatus of a cradle member having laterally disposed rigid arms, connection members movably associated with the rearward extremities of said arms for attachment to a vehicle frame, and a connection member fixed to the forward extremity of said arms and adapted for operative engagement by the hoisting mechanism, portions of said arms intermediate said connection members being adapted for operative engagement below the axle of a supported vehicle.

25. In a vehicle towing apparatus, the combination with a movable hoisting apparatus of a cradle member having laterally disposed rigid arms, connection members associated with the rearward extremities of said arms for attachment to a vehicle frame, a connection member fixed to the forward extremity of said arms and adapted for operative engagement by the hoisting mechanism, and retaining means associated with said arms for retentively engaging a vehicle axle.

26. In a vehicle towing apparatus, the combination with a movable hoisting apparatus of a cradle member having laterally disposed rigid arms arranged in converging relationship, connection members movably associated with the rearward extremities of said arms for attachment to a vehicle frame, and a connection member fixed to the forward extremity of said arms and adapted for pivotal connection with the hoisting mechanism.

27. In a vehicle towing apparatus, the combination with a movable hoisting apparatus of a cradle member having laterally disposed rigid arms, flexible connection members adapted to support the rearward extremities of said arms for attachment to a vehicle frame, and a connection member fixed to the forward extremity of said arms and adapted for operative engagement by the hoisting mechanism.

28. In a vehicle towing apparatus, the combination with a movable hoisting apparatus of a cradle member having laterally disposed rigid arms, connection members movably associated with the rearward extremities of said arms for attachment to a vehicle frame, and a connection member fixed to the forward extremity of said arms and adapted for pivotal connection with the hoisting mechanism.

29. In a vehicle towing apparatus, the combination with a movable hoisting apparatus of a cradle member having laterally disposed rigid arms, flexible connection members associated with the rearward extremities of said arms for attachment to a vehicle frame, a connection member fixed to the forward extremity of said arms and adapted for operative engagement by the hoisting mechanism, and retaining means movably associated with said arms for retentively engaging a vehicle axle.

30. In an apparatus for towing vehicles a combination comprising a motive vehicle, hoisting mechanism operably mounted thereon, a flexible suspension member operable by the hoisting mechanism, a guide rigidly mounted on the vehicle for cooperation with said suspension member, and an attaching member arranged to engage a disabled vehicle and have operative engagement with the suspension member.

In testimony whereof I have hereunto signed my name in the presence of two subscribing witnesses.

ALBERT J. DUKEN.

Witnesses:
    FRANCES K. GILLESPIE,
    C. S. BUTLER.